Jan. 2, 1951  J. OLSEN  2,536,954
LOADING AND UNLOADING LIFT PLATFORM FOR TRUCKS
Filed Feb. 25, 1948  2 Sheets-Sheet 1

James Olsen
INVENTOR.

Jan. 2, 1951 J. OLSEN 2,536,954
LOADING AND UNLOADING LIFT PLATFORM FOR TRUCKS
Filed Feb. 25, 1948 2 Sheets-Sheet 2

James Olsen
INVENTOR.

Patented Jan. 2, 1951

2,536,954

UNITED STATES PATENT OFFICE 2,536,954

LOADING AND UNLOADING LIFT PLATFORM FOR TRUCKS

James Olsen, Divernon, Ill., assignor of one-half to Fred A. Stutsman, Springfield, Ill.

Application February 25, 1948, Serial No. 10,671

4 Claims. (Cl. 214—77)

The present invention relates to new and useful improvements in lifts for loading and unloading material to and from a truck body, loading platform or other place where it is desired to load and unload material by a lifting action.

An important object of the invention is to provide a loading and unloading lift including the provision of a platform on which the material is placed together with mechanical means for raising and lowering the platform whereby to minimize the manual effort required for loading and unloading the material.

A still further object is to provide a loading and unloading lift which may be mounted in position in a truck body or loading platform and which will not interfere with the normal use of the truck or loading platform.

A still further object is to provide a loading and unloading lift which may be power or manually operated.

A still further object is to provide an apparatus of this character of simple and practical construction, which is efficient and reliable in operation, strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
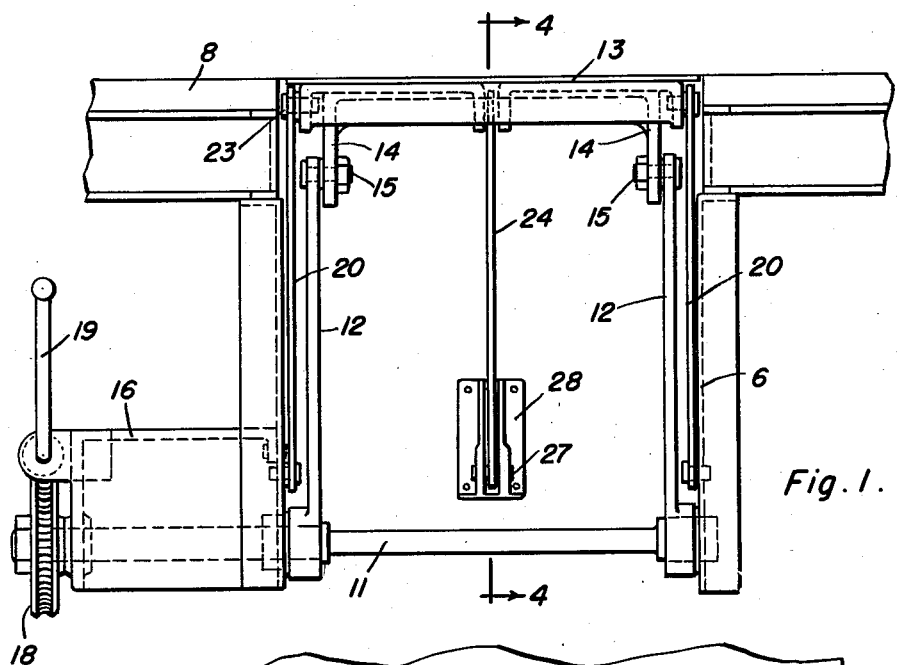
Figure 1 is a front elevational view.
Figure 2:
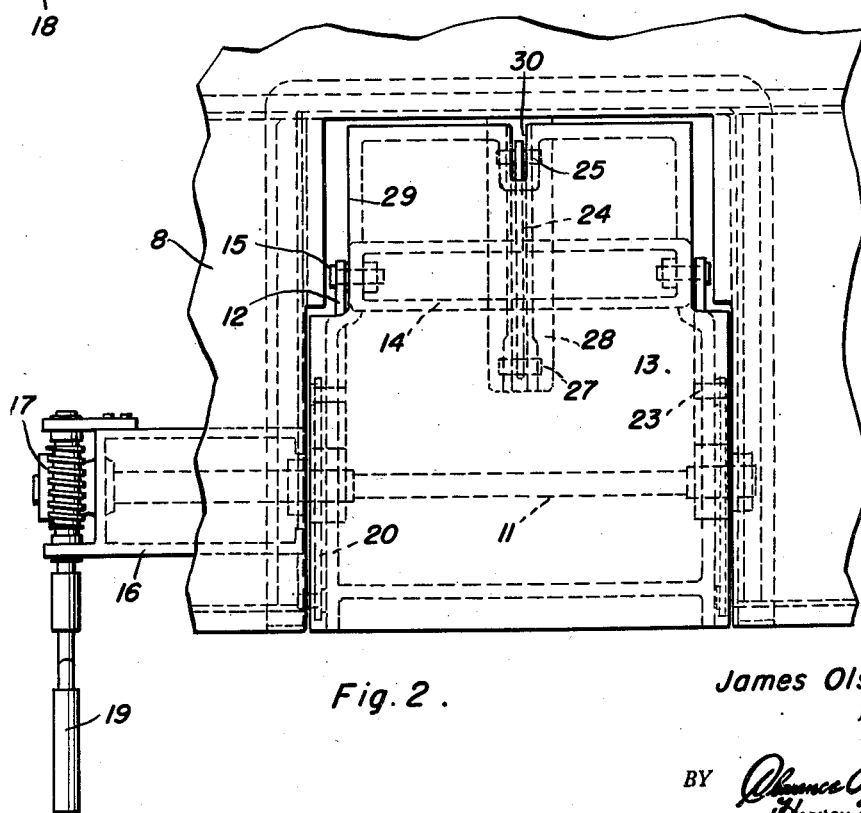
Figure 2 is a top plan view.
Figure 3:
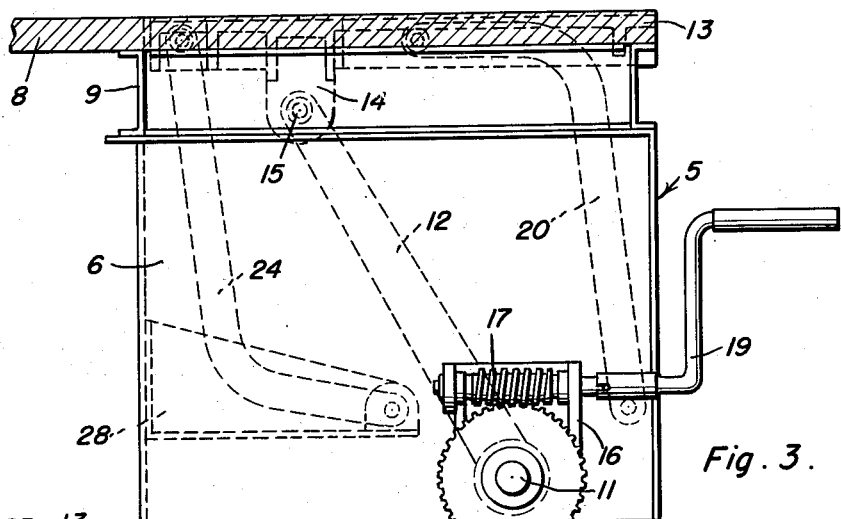
Figure 3 is a side elevational view.

Referring now to the drawings in detail wherein for the purpose of illustration I have disclosed a preferred embodiment of the invention the numeral 5 designates a supporting frame or mounting for the lift and including a pair of side walls 6 and a rear wall 7. The upper edge of the frame 5 is secured to the floor of a truck body, loading platform or other object 8 by means of channel iron members 9, the member 8 having an opening 10 at one edge thereof and beneath which the frame 5 is supported.

A shaft 11 is journalled in the side walls 6 transversely of the frame and adjacent its lower front edge and to which a pair of arms 12 are secured at their lower ends and with the upper ends of the arms pivoted to the under side of the rear portion of a lift platform 13 by means of brackets 14 and pins 15, the shaft 11 being positioned in the frame 5 forwardly of the pins 15 whereby the arms 12 are held at a rearwardly inclined position when the lift platform 13 is supported in the opening 10 flush with the surface of the member 8.

The shaft 11 extends outwardly at one side of the frame 5 and is journalled in a bracket 16 suitably secured to the adjacent side member 6. A worm 17 is journalled in the bracket 16 in engagement with a worm gear 18 secured to the outer end of shaft 11.

The worm 17 may be operated manually by a crank handle 19 detachably connected to one end of the worm, or the worm may be operated by a suitable power plant, such as an electric motor or the like (not shown).

A pair of front inverted L-shaped links 20 are pivoted at their lower ends on pins 21 secured to the lower front portion of side walls 6, the links having rearwardly extending end portions 22 at their upper ends pivoted to the under side of lift platform 13 by pins 23.

A single rear link 24 likewise of substantially L-shaped construction has its upper end pivoted adjacent the rear edge portion of platform 13 by a pin 25 and has a forwardly extending lower end 26 pivoted to a pin 27 carried by a bracket 28 suitably secured to frame 5.

Figure 4:
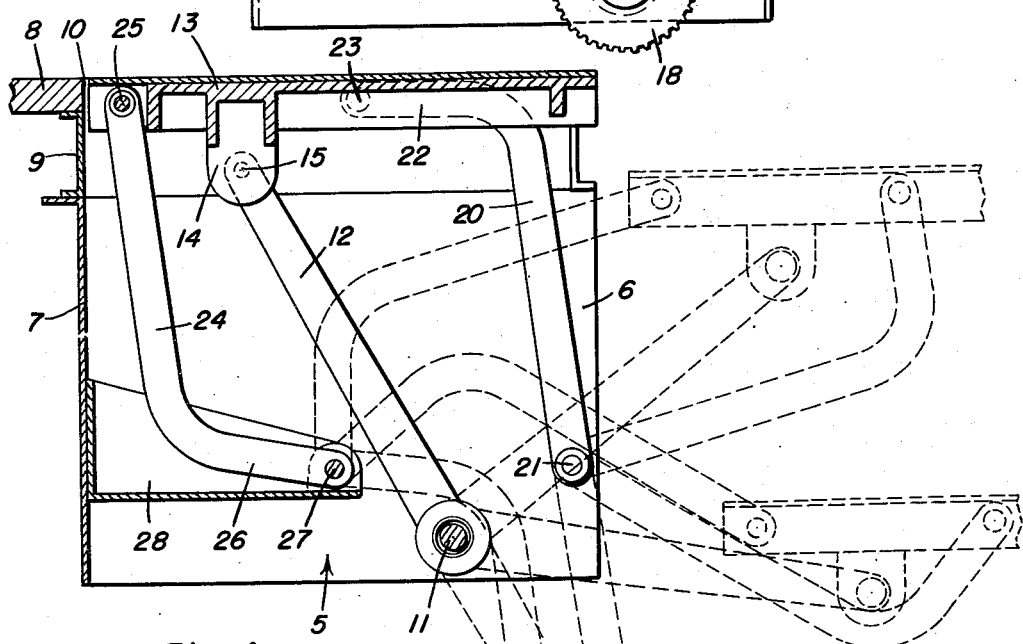
Figure 4 is a vertical sectional view taken substantially on a line 4—4 of Figure 1.

The rotation of shaft 11 in one direction by handle 19 or other means will swing arms 12 and platform 13 forwardly and downwardly from its raised position as shown in full lines in Figure 4 to any of the dotted line positions and a reverse rotation of shaft 11 will raise the arms and platform.

The links 20 and 24 swing with the arms to maintain the platform in a horizontal position during all stages of its raising and lowering movement.

The worm 17 and worm gear 18 will hold the platform at any position of adjustment.

The side edges of the platform at the rear thereof are reduced in width, as shown at 29, to accommodate the links 20 and arms 12 as the platform approaches its lowermost position, and the central rear portion of platform 13 is notched as shown at 30 to likewise accommodate the link 24.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A loading and unloading lift comprising a platform, a rockable shaft, a swingable arm connecting the shaft to the platform for raising and lowering of the latter, means swingable with the arm and attached to the platform for holding the same horizontally during its raising and lowering movement, said means comprising links pivoted at one end to the under side of the platform forwardly and rearwardly with respect to the arm, and said links being pivoted at their other ends to a supporting structure beneath the platform.

2. A loading and unloading lift comprising a platform, a rockable shaft, a swingable arm connecting the shaft to the platform for raising and lowering of the latter, and means swingable with the arm and attached to the platform for holding the same horizontally during its raising and lowering movement, said means comprising substantially L-shaped rear links and inverted substantially L-shaped front links pivoted at one end to the under side of the platform forwardly and rearwardly with respect to the arm, and said links being pivoted at their other ends to a supporting structure beneath the platform.

3. A loading and unloading lift comprising a frame, open at its front, top and bottom, a shaft journalled horizontally in the frame adjacent its lower front, an arm attached to the shaft and extending upwardly therefrom, a platform pivoted to the upper end of the arm for swinging forwardly and rearwardly in a raising and lowering movement into and out of position at the top of the frame, and front and rear links pivotally connecting the platform to the frame and supporting the platform horizontally at all stages of its movement, said arm and said links being housed in the frame when the platform is raised.

4. A loading and unloading lift comprising a frame, open at its front, top and bottom, a shaft journalled horizontally in the frame adjacent its lower front, an arm attached to the shaft and extending upwardly therefrom, a platform pivoted to the upper end of the arm for swinging forwardly and rearwardly in a raising and lowering movement into and out of position at the top of the frame, and front and rear links pivotally connecting the platform to the frame and supporting the platform horizontally at all stages of its movement, said links being substantially L-shaped, and said front links being inverted.

JAMES OLSEN.

REFERENCES CITED

The following references are of record in the file of this patent:

UNITED STATES PATENTS

| Number | Name | Date |
|---|---|---|
| 1,706,913 | Bush | Mar. 26, 1929 |
| 2,088,648 | Hansen | Aug. 3, 1937 |
| 2,192,388 | Schulz | Mar. 5, 1940 |
| 2,298,166 | Richards | Oct. 6, 1942 |
| 2,414,684 | Wohlforth | Jan. 21, 1947 |
| 2,456,805 | Wohlforth | Dec. 21, 1948 |